(12) United States Patent
Robert et al.

(10) Patent No.: US 9,607,349 B2
(45) Date of Patent: Mar. 28, 2017

(54) METHOD AND DEVICE FOR DETERMINING A SET OF MODIFIABLE ELEMENTS IN A GROUP OF PICTURES

(71) Applicant: CONTENTARMOR, Rennes (FR)

(72) Inventors: Antoine Robert, Mezieres sur Couesnon (FR); Gwenael Doerr, Rennes (FR)

(73) Assignee: CONTENTARMOR, Rennes (FR)

( * ) Notice: Subject to any disclaimer, the term of this patent is extended or adjusted under 35 U.S.C. 154(b) by 0 days.

(21) Appl. No.: 14/751,005

(22) Filed: Jun. 25, 2015

(65) Prior Publication Data

US 2015/0379659 A1    Dec. 31, 2015

(30) Foreign Application Priority Data

Jun. 27, 2014 (EP) .................................... 14306037

(51) Int. Cl.
*G06T 1/00* (2006.01)
*H04N 21/8358* (2011.01)
(Continued)

(52) U.S. Cl.
CPC ................ *G06T 1/005* (2013.01); *G06K 9/46* (2013.01); *G06T 1/0028* (2013.01); *H04N 19/44* (2014.11);
(Continued)

(58) Field of Classification Search
CPC .. G06K 2009/4666; G06K 9/46; G06T 1/005; G06T 1/0028; G06T 2201/0053;
(Continued)

(56) References Cited

U.S. PATENT DOCUMENTS

2007/0189377 A1    8/2007 Taylor et al.
2013/0188712 A1    7/2013 Xue et al.
(Continued)

FOREIGN PATENT DOCUMENTS

FR    2949283    2/2011
JP    2006121460    5/2006
(Continued)

OTHER PUBLICATIONS

Noorkami et al: "Digital video watermarking in P-frames with controlled video bit-rate increase", IEEE Transactions on Information Forensics and Security, vol. 3, n°3, Sep. 2008; pp. 441-455.
(Continued)

*Primary Examiner* — Jingge Wu
(74) *Attorney, Agent, or Firm* — David D. Brush; Westman, Champlin & Koehler, P.A.

(57) ABSTRACT

A method for determining a set of modifiable elements in a group of pictures of a coded bit-stream representative of an audio video content is disclosed. The method comprises determining a set of a candidate modifiable elements wherein a candidate modifiable element comprises a modified value of the coded bit-stream and a spatial propagation map associated with the modified value, a spatial propagation map comprising pixels whose decoding is impacted when the modified value is placed in the coded bit stream; determining a heat map for each reference frame, the heat map comprising, for each pixel of the reference frame, an information representative of the usage of said pixel for temporal prediction during the decoding of said part of the coded bit-stream coding a group of pictures; obtaining a set of modifiable elements among candidate modifiable elements, a modifiable element having a spatial propagation map that does not overlap with corresponding heat map.

13 Claims, 6 Drawing Sheets

(51) Int. Cl.
*H04N 19/51* (2014.01)
*H04N 19/593* (2014.01)
*H04N 19/467* (2014.01)
*H04N 21/234* (2011.01)
*H04N 21/44* (2011.01)
*H04N 19/44* (2014.01)
*G06K 9/46* (2006.01)

(52) U.S. Cl.
CPC ........... *H04N 19/467* (2014.11); *H04N 19/51* (2014.11); *H04N 19/593* (2014.11); *H04N 21/23418* (2013.01); *H04N 21/44008* (2013.01); *H04N 21/8358* (2013.01); *G06K 2009/4666* (2013.01); *G06T 2201/0053* (2013.01)

(58) Field of Classification Search
CPC .... G06T 1/0021; H04N 19/44; H04N 19/467; H04N 19/51; H04N 19/593; H04N 21/23418; H04N 21/44008; H04N 21/8358
See application file for complete search history.

(56) References Cited

U.S. PATENT DOCUMENTS

| | | | |
|---|---|---|---|
| 2015/0080020 A1* | 3/2015 | Edge | G01S 5/0236 455/456.1 |
| 2015/0082203 A1* | 3/2015 | James | H04N 21/23418 715/756 |
| 2015/0154453 A1* | 6/2015 | Wilf | G06K 9/00711 382/103 |
| 2015/0156369 A1* | 6/2015 | Reed | H04N 1/32309 382/100 |
| 2015/0310601 A1* | 10/2015 | Rodriguez | G06T 1/0007 348/150 |
| 2016/0132749 A1* | 5/2016 | Smyth | G06K 9/3233 382/162 |
| 2016/0203599 A1* | 7/2016 | Gillies | A61B 6/463 382/132 |
| 2016/0232425 A1* | 8/2016 | Huang | G06T 7/0012 |

FOREIGN PATENT DOCUMENTS

| | | |
|---|---|---|
| WO | WO2004012455 | 2/2004 |
| WO | WO2010021682 | 2/2010 |
| WO | WO2010021694 | 2/2010 |
| WO | WO2010021722 | 2/2010 |

OTHER PUBLICATIONS

Hartung et al: "Watermarking of uncompressed and compressed video", Signal Processing, vol. 66, No. 3, pp. 283-301, May 1998.

Noorkami et al: "Compressed-domain video watermarking for H.264", Proceedings of the IEEE International Conference on Image Process., Sep. 2005, vol. 2, pp. 890-893.

Langelaar et al: "Real-time labeling of MPEG-2 compressed video", Journal of Visual Communication and Image Representation, vol. 9, No. 4, pp. 256-270, Dec. 1998.

Zou et al: "H.264/AVC stream replacement technique for video watermarking", Proceedings of the IEEE International Conference on Acoustics, Speech and Signal Process., Apr. 2008, pp. 1749-1752.

Zou et al: "H.264/AVC substitution watermarking: A CAVLC example", Media Forensics and Security I, Jan. 2009, vol. 7254 of Proc. of SPIE; pp. 1-12.

Zou et al: "H.264 stream replacement watermarking with CABAC encoding", Proceedings of the IEEE International Conference on Multimedia and Expo, Jul. 2010, pp. 117-121.

Search Report Dated Sep. 19, 2014.

* cited by examiner

METHOD AND DEVICE FOR DETERMINING A SET OF MODIFIABLE ELEMENTS IN A GROUP OF PICTURES

This application claims the benefit, under 35 U.S.C. §119 of European Patent Application No. 14306037.4, filed Jun. 27, 2014.

TECHNICAL FIELD

In the following, a method for determining a set of modifiable elements in the domain of video watermarking is disclosed. Specifically, a method for determining a set of modifiable elements in a group of pictures of a coded bit-stream representative of an audio video content is disclosed, wherein the method comprising determining a heat map. The corresponding device is also disclosed.

BACKGROUND

This section is intended to introduce the reader to various aspects of the art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Traitor tracing consists in serving clients with content watermarked with some unique identifier. If a pirate copy is later found on an unauthorized distribution network, it is then possible to identify the misbehaving customer.

Among known methods for watermarking contents, an approach comprises modifying directly the bit stream in the compressed format without any kind of decompression. A key challenge is then to guarantee that the introduced changes do not significantly impair video quality at the decoding stage. The introduction of advanced entropy coding paradigms, such as context adaptation and arithmetic coding for instance, have made such bit stream modifications more challenging. A single modification of the bit stream could result in catastrophic degradation if no proper care, especially with respect to spatial and temporal propagation, is taken. When a frame, used for prediction, is watermarked, the introduced changes can be temporally propagated through the decoding process, and thereby jeopardize the imperceptibility of the watermark due to uncontrolled propagation of the introduced watermarks.

Temporal propagation, also referred to as temporal drift, originates from temporal prediction, a mechanism routinely used in video codecs. It can affect a large number of pixels of a large number of frames: (i) in a given frame, several pixels can use the same reference pixel in their predictions, and (ii) pixels from different frames can also use the same reference pixel. Moreover, sub-pixel interpolations involved in the temporal predictions further enlarge the effect of the modification.

The analysis of the bit stream in order to identify the set of (position, value) where watermarks can be inserted at the embedding stage is also known as watermark preprocessing.

A first solution of watermark preprocessing is available with bit stream video watermarking systems that watermark encoded non-reference frames (as non-reference B-frames in most codecs), thus avoiding any temporal propagation of the introduced changes by construction. However, reference frames are also of great interest. Indeed, being able to watermark reference frames would increase the embedding rate and thus the watermark robustness. Furthermore, several distribution networks deal with streams that only use reference frames to have an alignment between decoding and rendering frame orders that imply more flexible streaming capabilities. Therefore, watermarking these reference frames is of great interest for bit stream watermarking systems but of course raises challenges regarding temporal propagation management.

For reference frames, such as frames used to predict other ones (I frame, reference B frames or P frames) a second solution, as disclosed in US20130188712, consists in computing compression influence values that indicate, for each macroblock, how much it influences the pixel values of other macroblocks through intra-frame or inter-frame prediction. However, building these compression influence values is quite challenging in practice and highly computationally intensive. It requires indeed to track the influence of a block over several frames in time. Macroblocks with small influence values are then selected for watermarking. This being said, US20130188712 does not disclose any mechanism to prevent the temporal propagation of different changes from overlapping, possibly resulting in uncontrollable visual artefacts.

A variant of this solution is disclosed in FR2949283A1. An image including a macroblock not serving as reference for decoding the following and preceding images of the video stream (i.e. during intra-frame or inter-frame prediction) is identified on-the-fly among the video images in the video stream. This non-reference macroblock is then replaced by an alternate macroblock encoding the desired identification information, i.e. the watermark. However, FR2949283A1 fails to explicitly disclose how the macroblocks not serving as reference are identified and thus does not solve the challenge of computing the compression influence values.

A computation efficient method for determining candidate watermarks that manages the temporal and spatial propagation of the watermarks due to prediction is therefore needed. For instance, one could consider watermarks (position, value) whose spatial propagation do not contain any macroblock used for prediction by another frame. This is a selection somewhat stricter than the ideal one, aka. selecting a set of candidate watermarks whose spatio-temporal propagation maps do not intersect, but it can be computed rather efficiently.

SUMMARY

The present principles overcome at least one of the disadvantages of prior art by proposing a method for determining a set of modifiable elements of a coded bit-stream representative of an audio video content wherein the method comprising determining a heat map representative of the usage of each pixel as reference.

Indeed, a salient idea of the present principles is to watermark regions in the reference frames without any or with controlled temporal propagation comprising in a first step both analyzing the bit stream to find all locations eligible for watermarking, together with the associated alternate values and characteristics (spatial propagation, and some robustness and fidelity criteria) for each watermarkable frame; and constructing, for each reference frame, a map representing the usage of each pixel as reference, i.e. a pixel involved in some predictions of other frames, called reference heat map or heat map. Then in a second step, the set of correct locations are selected as those which fulfill the robustness and fidelity criteria and whose spatial propagation maps are restricted within non-reference regions of the reference frames given by the corresponding reference heat maps.

To this end, a method for determining a set of modifiable elements in a group of pictures of a coded bit-stream representative of an audio video content is disclosed. The skilled in the art will notice that a modifiable element does not correspond to a syntax element but to a segment in the bitstream coding the content. Indeed, with CABAC entropy coding, a syntax element is encoded on a non-integer number of bits. As a result, the segment of the bitstream associated to a modifiable element may contribute to the encoding of a single syntax element or even to several of them but rarely fully encode a single syntax element. In other words, a modifiable element comprises a fixed length alternative value (for instance a 2-byte long binary word) at a given position in the bitstream. The method comprises determining a set of a candidate modifiable element comprising a position, a modified value of the coded bit-stream at this position, and a spatial propagation map associated with the modified value; determining a heat map comprising, for each pixel of a reference frame, an information representative of the usage of the pixel for temporal prediction during the decoding of the coded bit-stream; obtaining a modifiable element among candidate modifiable elements of the coded bit-stream according to the heat map and the spatial propagation map of the modifiable element.

According to a variant, the information representative of the usage of a pixel for temporal prediction is a binary value which indicates whether the pixel is used or not for temporal prediction. In another variant, the information representative of the usage of a pixel for temporal prediction comprises the number of times the pixel is used for temporal prediction. In yet another variant, the information representative of the usage of a pixel for temporal prediction comprises the sum of the prediction weights associated with the pixels using the reference pixel for prediction. Each variant is advantageously adapted to a variant with respect to the management of the temporal propagation of the watermarks as hereafter described.

Advantageously, a heat map is determined for reference frames where candidate modifiable elements are present. In an advantageous embodiment, such reference frames are limited to P frames and B reference frames.

According to a specific embodiment, determining a heat map comprises, for each decoded frame of the group of pictures: initializing the information representative of the usage of a pixel for temporal prediction, for instance to zero; decoding said frame; and for each decoded macroblock of said decoded frame, updating the information representative of the usage of a pixel for temporal prediction in the heat map(s) associated with the reference frame(s) that the decode macroblock points to.

According to another specific embodiment, obtaining a modifiable element comprises, for each frame of the group of pictures scanned in backward order, selecting a candidate modifiable element whose spatial propagation map does not overlap with the temporal heat map of the frame; and updating the information representative of the usage of a pixel for temporal prediction for all pixels used as reference by macroblocks of the spatial propagation map associated with the modified value of the selected candidate modifiable element. Advantageously, this second step for obtaining modifiable element is realized in reverse decoding order. For each frame, the step selects the set of candidate modifiable elements which both fulfil the robustness and fidelity criteria and propagate into non-referenced regions of the reference frames, as given by the corresponding reference heat maps; and then updates the previous reference heat maps according to the pixels used for predicting the macroblocks of the selected elements.

According to a first variant, selecting a candidate modifiable element comprises discarding candidate modifiable elements when the value in the heat map of at least one pixel of the spatial propagation map is not equal to zero. Advantageously, this variant only keeps watermarks that do not induce any temporal propagation. According to a second variant, selecting a candidate modifiable element comprises, for each candidate modifiable element, determining a first dependency value comprising the number of pixels in the spatial propagation map of the candidate modifiable element that are used for prediction according to the heat map; and discarding all candidate modifiable elements having their first dependency value larger than a first threshold. Advantageously, this variant retains elements that are likely to induce limited temporal propagation since only a controlled number of pixels of the spatial propagation map is used for prediction by other frames. According to a third variant, selecting a candidate modifiable element comprises, for each candidate modifiable element, determining a second dependency value comprising the sum of the information representative of the usage of a pixel for temporal prediction associated with all pixels in the spatial propagation map of the candidate modifiable element; and discarding candidate modifiable elements whose second dependency value exceeds a second threshold. Advantageously, this variant picks elements that yield controlled temporal propagation. For example, this variant guarantees that a watermark will not affect directly more pixels in other frames than a specified value.

A device for determining a set of modifiable elements in a group of pictures of a coded bit-stream representative of an audiovisual content is disclosed. The device comprises at least one processor configured to determine a set of candidate modifiable elements comprising a position in the coded bit-stream, a modified value, and a spatial propagation map associated with the modified value; to determine a heat map comprising, for each pixel of a frame, an information representative of the usage of the pixel for temporal prediction during the decoding of the coded bit-stream; and to select a modifiable element among the candidate modifiable elements of the coded bit-stream according to the heat map and the spatial propagation map of the modifiable element.

A device for determining a set of modifiable elements in a group of pictures of a coded bit-stream representative of an audiovisual content is disclosed. The device comprises means for determining a set of a candidate modifiable elements comprising a position in the coded bit-stream, a modified value, and a spatial propagation map associated with the modified value; means for determining a heat map comprising, for each pixel of a frame, an information representative of the usage of the pixel for temporal prediction during the decoding of the coded bit-stream; and means for selecting a modifiable element among the candidate modifiable elements of the coded bit-stream according to the heat map and the spatial propagation map of the modifiable element.

A computer program product comprising program code instructions to execute the steps of the processing method, according to any of the embodiments and variants disclosed, when this program is executed on a computer.

A processor readable medium having stored therein instructions for causing a processor to perform at least the steps of the processing method, according to any of the embodiments and variants disclosed.

While not explicitly described, the present embodiments may be employed in any combination or sub-combination. For example, any variant of the information carried by the heat map could be combined with the selection step or with the heat map updating step. Besides, any characteristic or variant described for the method is compatible with a device intended to process the disclosed methods and with a computer-readable storage medium storing program instructions.

BRIEF DESCRIPTION OF THE DRAWINGS

Other characteristics and advantages of the present principles will appear through the description of a non-limiting embodiment of the present principles, which will be illustrated, with the help of the enclosed drawings.

DETAILED DESCRIPTION OF THE PREFERRED EMBODIMENTS

Figure 1:
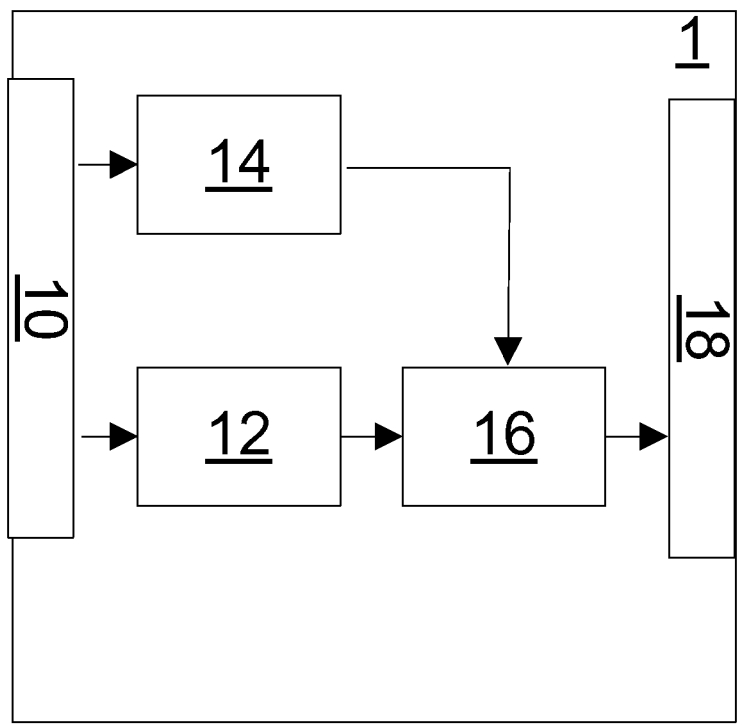
FIG. 1 depicts a device for determining a set of modifiable element, according to a specific and non-limitative embodiment of the present principles.

FIG. 1 depicts a device 1 for determining a set of modifiable elements according to a specific and non-limitative embodiment of the present principles. The device 1 comprises an input 10 configured to receive at least one group of pictures, made of a number of frames I, P, and B. The pictures I, P, B may be obtained from a source. According to different embodiments of the present principles, the source belongs to a set comprising:
- a local memory, e.g. a video memory, a RAM, a flash memory, a hard disk;
- a storage interface, e.g. an interface with a mass storage, a ROM, an optical disc or a magnetic support;
- a communication interface, e.g. a wired interface (for example a bus interface, a wide area network interface, a local area network interface) or a wireless interface (such as a IEEE 802.11 interface or a Bluetooth interface); and
- a picture capturing circuit (e.g. a sensor such as, for example, a CCD (or Charge-Coupled Device) or CMOS (or Complementary Metal-Oxide-Semiconductor)).

The input 10 is linked to a module 12 configured to determine a set of candidate modifiable elements or candidate watermarks. Each candidate modifiable element comprises a position in the coded bit-stream, a modified value, and a spatial propagation map associated with this modified value. The spatial propagation map is described hereafter. The input 10 is also linked to a module 14 configured to determine the heat maps. Advantageously the module 14 comprises a decoder. The module 12 determining candidate modifiable elements and module 14 determining the heats maps operate in parallel or in any order. The module 16 is configured to obtain modifiable elements based on the spatial propagation maps and the heat maps. The module 16 is linked to an output 18. The modifiable elements can be stored in a memory or can be sent to a watermark embedder. As an example, the modifiable elements are stored in a remote or in a local memory, e.g. a video memory or a RAM, a hard disk. In a variant, the modifiable elements are sent to a watermark embedder by means of a storage interface, e.g. an interface with a mass storage, a ROM, a flash memory, an optical disc or a magnetic storage and/or transmitted over a communication interface, e.g. an interface to a point-to-point link, a communication bus, a point to multipoint link or a broadcast network.

Figure 2:
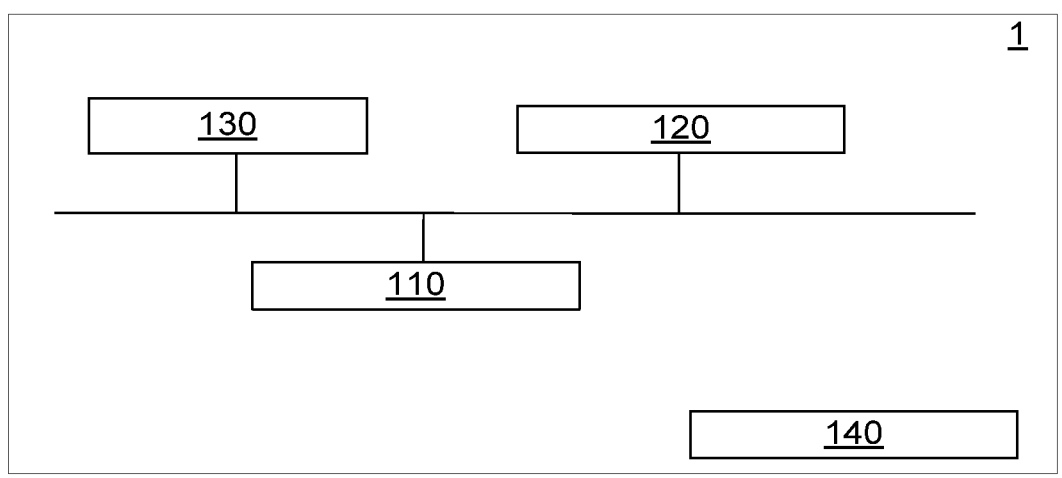
FIG. 2 represents an exemplary architecture of the device of FIG. 1, according to a specific and non-limitative embodiment of the present principles.

FIG. 2 represents an exemplary architecture of the device 1 according to a specific and non-limitative embodiment of the present principles. The processing device 1 comprises one or more processor(s) 110, which is(are), for example, a CPU, a GPU and/or a DSP (English acronym of Digital Signal Processor), along with internal memory 120 (e.g. RAM, ROM, EPROM). The processing device 1 comprises one or several Input/Output interface(s) 130 adapted to display output information and/or allow a user entering commands and/or data (e.g. a keyboard, a mouse, a touchpad, a webcam, a display); and a power source 140 which may be external to the processing device 1. The processing device 1 may also comprise network interface(s) (not shown). According to an exemplary and non-limitative embodiment of the present principles, the processing device 1 further comprises a computer program stored in the memory 120. The computer program comprises instructions which, when executed by the processing device 1, in particular by the processor 110, make the processing device 1 carry out the processing method described in FIG. 3. According to a variant, the computer program is stored externally to the processing device 1 on a non-transitory digital data support, e.g. on an external storage medium such as a HDD, CD-ROM, DVD, a read-only and/or DVD drive and/or a DVD Read/Write drive, all known in the art. The processing device 1 thus comprises an interface to read the computer program. Further, the device 1 could access one or more Universal Serial Bus (USB)-type storage devices (e.g., "memory sticks.") through corresponding USB ports (not shown). According to exemplary and non-limitative embodiments, the processing device 1 is a device, which belongs to a set comprising:
- a mobile device;
- a communication device;
- a game device;
- a tablet (or tablet computer);
- a laptop;
- a still picture camera;
- a video camera;
- an encoding chip;
- a decoding chip;
- a still picture server;
- a video server (e.g. a broadcast server, a video-on-demand server or a web server); and
- a video sharing platform.

Figure 3:
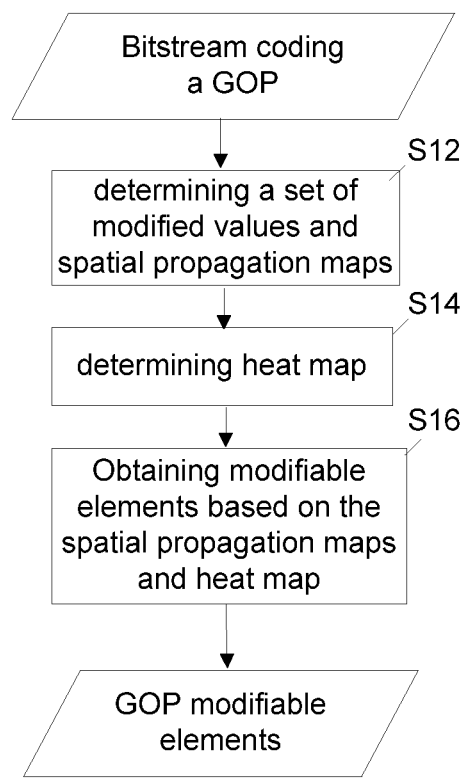
FIG. 3 represents a flowchart of a method for determining a set of modifiable elements, according to a specific and non-limitative embodiment of the present principles.

FIG. 3 represents a flowchart of a method for determining a set of modifiable elements for according to a specific and non-limitative embodiment of the present principles.

In a step S12, a set of candidate modifiable elements is obtained, e.g. by the module 12 implementing a watermarking algorithm, for each frame from the bit stream coding a group of picture. A candidate modifiable element comprises a position in the coded bit-stream, where watermarks will be inserted later on at the embedding stage, along with an associated alternative value. Hereafter, the couple (position, alternative value) is referred to as the modified value and both terminology are used interchangeably. A candidate modifiable element also comprises the induced spatial propagation map. In a variant, a candidate modifiable element further comprises characteristics such as some robustness and fidelity criteria. Advantageously, any watermarking algorithm of the prior art is compatible with the present principles for determining a candidate modifiable element. Such an algorithm is for instance described in WO 2010/021682 A1. The skilled in the art will appreciate that in the variant relative to H264 watermarking algorithm wherein the mark is carried by a motion vector in the bit-stream, the spatial propagation associated with an alternative value of a motion vector, results from the prediction of a block from the alternative motion vector. As represented on FIG. 7, the spatial propagation SP6 is triggered by the macroblock 700 of frame i=6, whose motion vector may be modified to an alternative value by the watermarking process and thereby cause alterations to neighbor blocks. The spatial propagation map SP6 comprises all the pixels whose decoding is impacted by using the alternative value of the motion vector for 700, i.e. the pixels of the macroblocks 700 and of its right and bottom neighbor macroblocks in this particular case. In another variant relative to MPEG2, the skilled in the art will appreciate that the propagation map is trivial and corresponds to the alternative value itself. The frames where the marks are searched are called watermarkable frames. In a variant, I frames are not watermarkable frames. A decoding of the bitstream coding the group of pictures is thus needed at this step.

In a step S14, a heat map is determined. The heat map comprises, for each pixel of a reference frame, an information representative of the usage of the pixel for temporal prediction during the decoding of the coded bit-stream. Advantageously, heat maps are not constructed for each frame of the group of pictures, but only for frames where candidate modifiable elements are present and which are used as reference. Thus, in a variant where modified values correspond to motion vectors, heat maps are not constructed for I frames since they do not host motion vectors. On the contrary, in a variant where modified values correspond to DCT coefficients, it is relevant to construct heat maps for I frames. Heat maps do not need to be constructed for non-reference frames although theses frames comprise candidate modifiable elements. Nevertheless, for practical reasons, it may be convenient to also define heat maps for non-reference frames that are by default empty. Advantageously, the heat maps are constructed for P frames and B reference frames, which can then be introduced in the subset of frames of the GOP where candidate modifiable elements can be found. Such heat maps associate a value with each pixel of the corresponding frame and have therefore the same dimension (width and height) as the video frames. Advantageously, the heat maps are stored as tables of values wherein the indexes in the table correspond to the position of the pixel in the frame. The values of the heat map are derived by collecting information throughout the decoding of the macroblocks of the GOP. In a first variant, the heat map comprises, for each pixel of the associated reference frame, an information representative of the usage of this pixel for temporal prediction, i.e. one or several macroblocks in other frames rely on the value of this pixel during the decoding process. According to a first variant, the information representative of the usage of a pixel for temporal prediction is a binary value indicating whether this pixel is used for temporal prediction (binary value set to one) or not (binary value set to zero). For instance, for each pixel of the frame, the information representative of the usage of this pixel for temporal prediction is initialized to zero at the beginning of the GOP decoding and is set to one, each time this pixel is used for the decoding of a macroblock of another frame. According to a second variant, the information representative of the usage of a pixel for temporal prediction characterizes the number of times this pixel is used for temporal prediction. For instance, for each pixel of the frame, the information representative of the usage of this pixel for temporal prediction is initialized to zero at the beginning of the GOP decoding and is incremented by one, each time this pixel is used for the decoding of a macroblock of another frame. According to a third variant, the information representative of the usage of a pixel for temporal prediction is a cumulative prediction weight and thus carries a finer information. For instance, for each pixel of the frame, the information representative of the usage of this pixel for temporal prediction is initialized to zero at the beginning of the GOP decoding and is incremented by the weight used during the prediction (as a pixel can be predicted as a weighted average of two different pixels coming from two distinct reference frames) or during the interpolation (as a pixel can be predicted by a sub-pixel coming from the interpolation of several reference pixels), each time this pixel is used for the decoding of a macroblock of another frame. According to other variants, the heat map can also carry additional information relating to the macroblocks that use a pixel as reference, e.g. a list containing the frame number and the predicted pixel position (that uses a particular reference pixel).

Advantageously, step S12 and step S14 are performed in parallel. Thus a single GOP decoding is performed for the obtaining of spatial propagation maps and heat maps. However, the method is compatible with the steps performed sequentially in any order thus requiring separate decoding.

Figure 4:
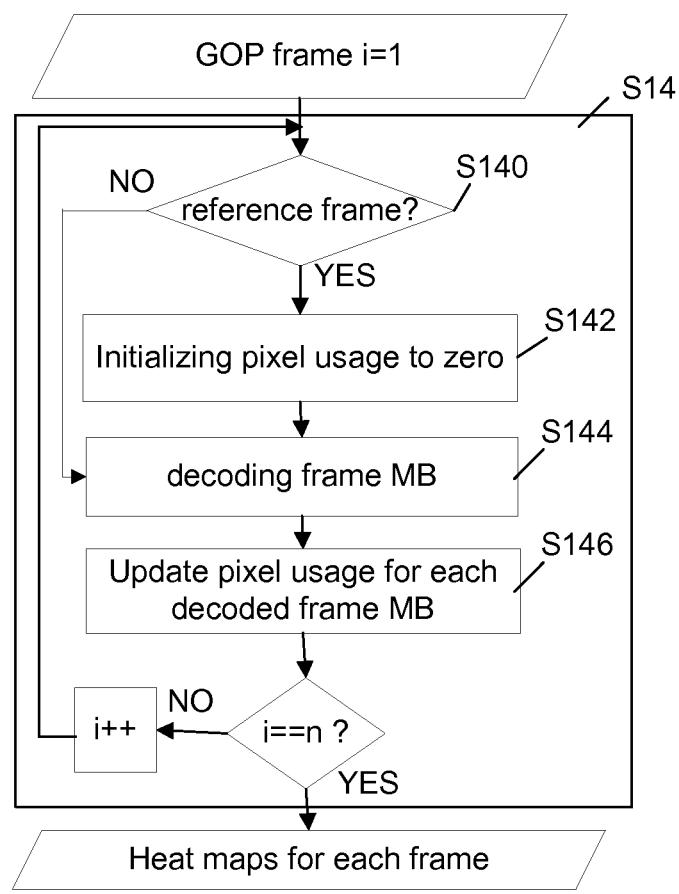
FIG. 4 represents a detail of the flowchart depicted on FIG. 3, according to a specific and non-limitative embodiment of the present principles.
Figure 6:
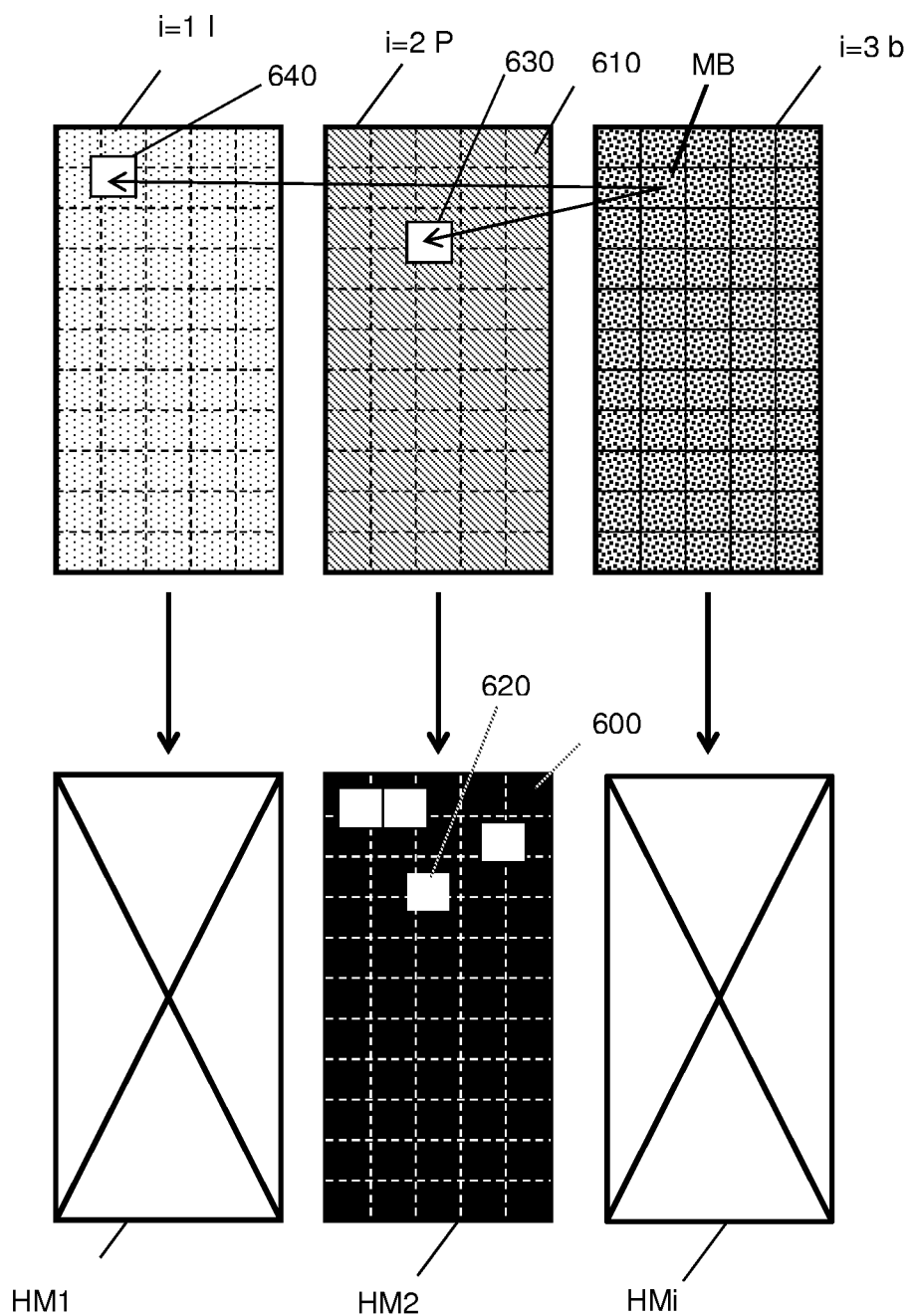
FIG. 6 illustrates the determination of the heat maps, according to a specific and non-limitative embodiment of the present principles.

FIG. 4 provides a detailed view of the step S14 of the flowchart depicted on FIG. 3 according to a specific and non-limitative embodiment of the present principles. Besides, FIG. 6 illustrates the determination of the heat map according to a specific and non-limitative embodiment of the present principles. Figures are jointly described. A two dimension representation of the frame i and corresponding heat map HMi is used. According to the present representation, binary values are used in the heat map to represent the usage of a pixel, or more precisely of pixels of a macroblock MB, in a temporal prediction. A frame i is divided into macroblock MB comprising N pixels. In FIG. 6, the black macroblock 600 corresponds to a macroblock 610 yet not used in temporal prediction, whereas the white one 620 corresponds to a macroblock already used for temporal prediction 630. However the present principles is not limited to this convention and a table comprising integer values, real values, coding multi-colour levels could have been used. The process of step S14 is repeated during the decoding of each group of pictures. Within a group of picture, a frame counter is initialized to one and is incremented by one until reaching the end of the group. In a step S140, the current frame i is tested to determine if the associated heat map HMi needs to be created. For instance, the GOP represented on FIG. 6 comprises firstly a reference I frame, secondly a reference P frame and thirdly a B non-reference frame (noted b). As previously exposed, the heat map is only relevant for reference frames, such as I, P and B reference frames, and, in a refinement, for reference frames of the GOP which contain candidate elements. In a variant where candidate elements are motion vectors, the heat map HM1 is not constructed for the reference frame I (no candidate element), as well as the heat map HMi associated with the frame i=3 (non-reference b frame). In practice, if the test S140 is positive (YES) for an input frame i, the corresponding heat map HMi is created and initialized in a step S142. The information representative of the usage of a pixel for temporal prediction is set to zero for all pixels of the frame. If the test S140 is negative (NO), the step S142 is skipped. According to a variant, this step S142 is not skipped and each heat map value of a non-reference frame is set to a null value, for instance −1 or 0, and subsequently ignored i.e. these heat maps are not updated during the decoding of the following frames of the GOP. In a step S144, the current frame is decoded, one macroblock MB after the other. The macroblocks MB are decoded sequentially from the first upper left MB to the last bottom right MB, taking care to record the dependency between macroblocks through temporal prediction. As represented in FIG. 6, the decoding of the macroblock MB in frame i=3 uses, for instance, the macroblock 630 of the P frame (i=2) and the macroblock 640 of the I frame (i=1). Thus, in a step 146, the information representative of the usage of a pixel for temporal prediction corresponding to the pixels of the macroblock 630 in the heat map HM2 is set to one (white macroblock 620). In contrast, the macroblock the heat map HM1 is left unchanged. Indeed, in a variant where candidate elements are motion vectors, no temporal propagation information is need for the pixels of I frames since they do not host candidate elements. As a result, in this step 146, the heat maps associated with the previously decoded frames, between 1 and i−1, are sequentially updated according to the dependency of the decoded MB in the current frame i=3. The process is repeated for each successive frame of the GOP. While decoding each frame of the GOP, each relevant heat map is updated which comprises at least one and potentially up to 12 heat maps in H.264 as up to 12 reference frames are defined in the standard.

Figure 5:
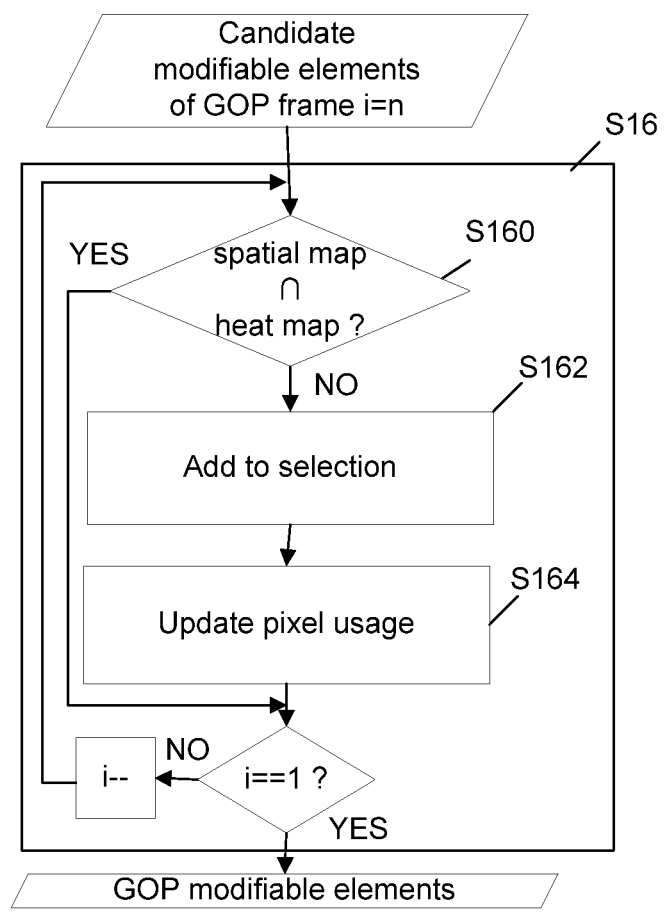
FIG. 5 represents a detail of the flowchart depicted on FIG. 3, according to a specific and non-limitative embodiment of the present principles.
Figure 7:
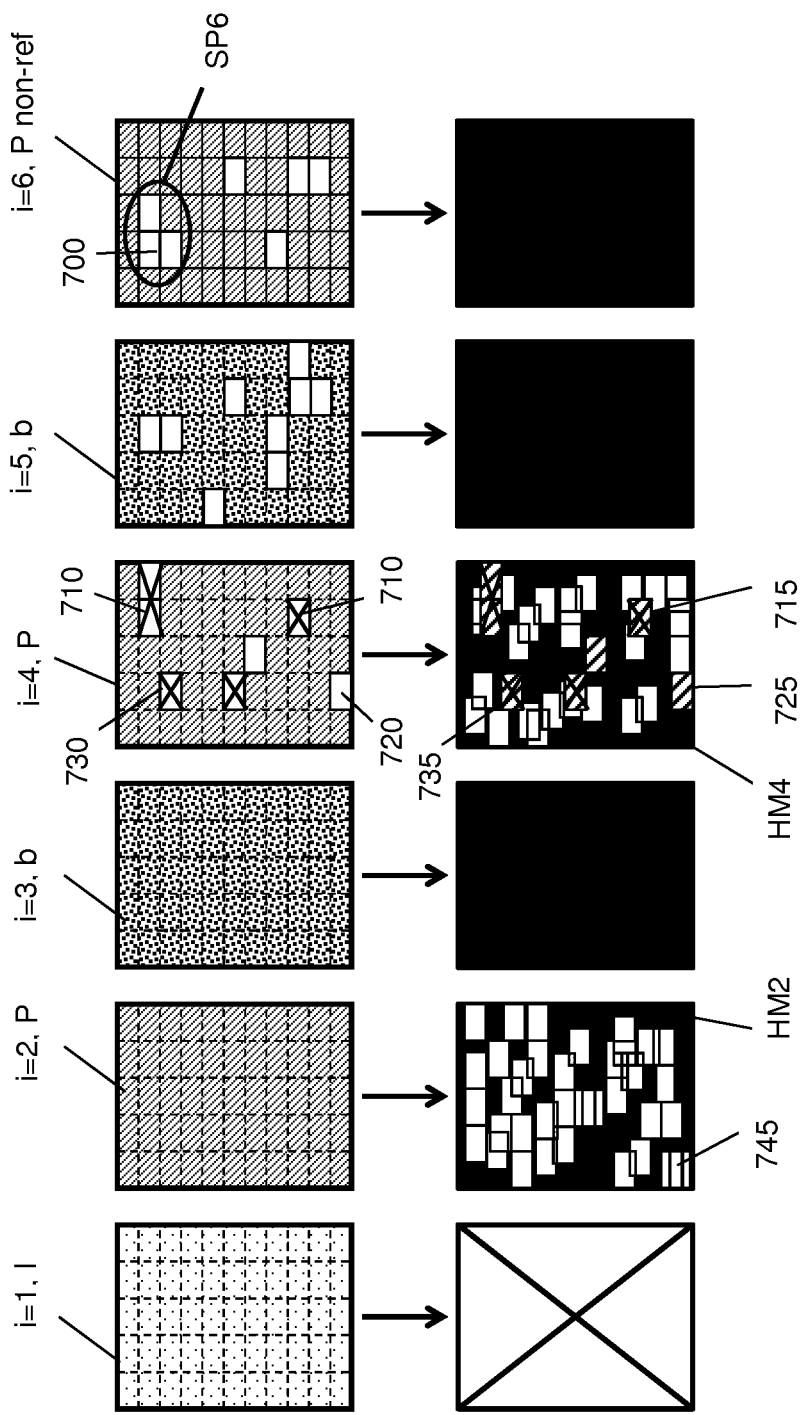
FIG. 7 illustrates the selection of a modifiable element according to a spatial propagation map and a heat map, according to a specific and non-limitative embodiment of the present principles.

Back to FIG. 3, in the step S16, modifiable elements among candidate modifiable elements of the coded bitstream are selected based on the spatial propagation map of the modifiable element and the corresponding heat map. FIG. 5 details this step S14 of the flowchart according to a specific and non-limitative embodiment of the present principles. Besides, FIG. 7 illustrates the selection of modifiable elements according to a specific and non-limitative embodiment of the present principles. FIGS. 5 and 7 are jointly described. The step S16 is performed by processing the GOP in backward order, from the last frame i=n to the first frame i=1. The step S16 mainly comprises two sub-steps. Firstly, candidate modifiable elements that are compliant with respect to spatial (propagation map) and temporal propagation (heat map) are selected as watermarks and secondly, the heat maps are updated according to the pixels referenced by the macroblocks of the spatial propagation map associated with the alternate value. In a nutshell, for non-reference frames (type b), the selection strategy is the one used in the classical watermarking system such as described in WO 2010/021682 A1. The skilled in the art will appreciate that, for each candidate position, the most invisible and robust candidate modifiable elements, whose spatial propagation does not overlap with previously shortlisted ones, are preferably selected as watermark. Thus, in the example GOP of FIG. 7, the last frame i=6 of the GOP is a frame P not used as reference since it is the last frame of the GOP, each modifiable macroblock 700, which is modified according to an alternative value of a motion vector, will not temporally propagate to other frames. The selection strategy previously described is applied.

In contrast, for reference frames (type P and B), the selection strategy is applied with another constraint that accounts for temporal propagation (as processed in step S14). For instance, in the example GOP of FIG. 7, the frame i=4 of the GOP is a P frame used as reference. The steps S160, S162 and S164 are sequentially repeated for each modifiable macroblock 710, 720, 730 associated with a candidate modifiable element. Thus, in a preliminary step, a modifiable macroblock 710 of a current frame i is obtained for evaluation. In a first step S160, when the spatial propagation map of the candidate modifiable element (associated with modifiable macroblock 710 or 730) overlaps with the heat map HM4 associated with the processed frame, the modifiable element (associated with modifiable macroblock 710 or 730) is not selected as possible watermark. This is represented on FIG. 7 by a crossed out block 710 or 730. In the binary representation of FIG. 7, "overlapping" means that the position of at least one modified pixel in the spatial propagation map due to the modified element is identical to the position of a pixel that is used for temporal prediction. In other words, candidate modifiable elements are discarded when the value in the heat map of at least one pixel in the spatial propagation map, virtually mapped onto the heat map (715 or 735), is not equal to zero. On the contrary, when the spatial propagation map of the candidate modifiable element (associated with modifiable macroblock 720) does not overlap with the heat map 725 on HM4 of the processed frame, the modifiable element (associated with modifiable macroblock 720) is selected in a step S162 as possible watermark. Therefore on frame i=4, two modifiable elements are selected. Advantageously, this variant where the selected watermarks are only composed of pixels not used as reference (pixels with 0 values in black the corresponding heat map of as depicted in FIG. 7) avoids, by construction, any temporal propagation.

However, in other variants, the selection can be more flexible and permit limited temporal propagation by adding in the selection candidate modifiable elements having some or all pixels with a low reference score, i.e. a low value in the corresponding heat map. For example, if a candidate modifiable element uses one pixel with a score lower or equal to 1 (the other being 0), it will propagate temporally to one other frame/pixel that can be known if the heat map carries supplemental information about the coming reference. Accordingly, in a first variant, for each candidate modifiable element, a first dependency value comprising the number of pixels in the spatial propagation map of the current candidate modifiable element that are used for temporal prediction according to the heat map is computed. Next, all candidate modifiable elements having this first dependency value larger than a first threshold are discarded. According to this variant, the candidate modifiable element (resulting into modifiable macroblock 730) having only a small overlap with the heat map is selected. According to a second variant compatible with non-binary heat maps, for each candidate modifiable element, a second dependency value comprising the sum of the information representative of the usage of a pixel for temporal prediction associated with the pixels in the spatial propagation map of the candidate modifiable element is computed. Subsequently, all candidate modifiable elements having this second dependency value larger than a second threshold are discarded. According to this variant, a candidate modifiable element is selected as long as it impacts only a small number of macroblocks.

As a result, the additional step S16 permits, depending on the described variant, to avoid or control the temporal propagation of the inserted watermarks.

Furthermore, in a final step S164, the information representative of the usage of a pixel for temporal prediction is updated for all pixels used as reference by macroblocks of the spatial propagation map associated with the modified value of the selected candidate modifiable element. Indeed, since the watermarking system modifies predictions for instance through the modification of the motion vector, it also modifies the way the reference frames are used, thus the reference heat maps, but in a slight way. For instance, a macroblock 720 of the spatial propagation map associated with a selected modified value is represented on FIG. 7 in frame i=4. Depending on whether the original or the alternative motion vector is used, the temporal prediction relies on one of two macroblocks at the bottom left of the frame i=2 and the heat map therefore needs to be update 745 to guarantee that both macroblocks are preserved. More precisely, the block 745 associated with the original motion vector appears in the heat map HM2 at step S146 whereas the other one appears during the update step S164 once the corresponding modifiable element has been selected. Thus, for each selected watermark, the heat maps associated with the frames referenced by the macroblock of the spatial propagation map needs to be updated to account for this potential alternate configuration.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a Blu-ray, a DVD often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for determining a set of modifiable elements of a coded bit-stream representative of an audio video content, said method comprising for a part of said coded bit-stream coding a group of pictures:
   determining a set of candidate modifiable elements, wherein a candidate modifiable element comprises a modified value for a segment of the coded bit-stream at a given location and a spatial propagation map associated with said modified value, said spatial propagation map comprising pixels whose decoding is impacted when said modified value is placed in the coded bit stream at said given location;
   determining a heat map for each reference frame comprising, for each pixel of said reference frame, an information representative of the usage of said pixel for temporal prediction during the decoding of said part of said coded bit-stream coding a group of pictures;

obtaining a set of modifiable elements among said set of candidate modifiable elements, wherein a modifiable element has a spatial propagation map that does not overlap with corresponding heat map.

2. The method according to claim 1 wherein determining said information representative of the usage of said pixel for temporal prediction comprises a binary value indicating whether the pixel is used for said temporal prediction.

3. The method according to claim 1 wherein determining said information representative of the usage of said pixel for temporal prediction comprises the number of times the pixel is used for said temporal prediction.

4. The method according to claim 1 wherein determining said information representative of the usage of said pixel for temporal prediction comprises a cumulative weight of the pixel used for prediction.

5. The method according to claim 1 wherein said reference frames comprise P frames and B reference frames.

6. The method according to claim 1 wherein determining a heat map comprises, for each frame of said group of pictures:
  initializing said information representative of the usage of a pixel for temporal prediction;
  decoding said frame and,
  for each decoded macroblock of said decoded frame, updating said information representative of the usage of a pixel for temporal prediction when said pixel is used as reference for said decoded macroblock.

7. The method according to claim 6 wherein obtaining a modifiable element comprises for each frame of said group of pictures scanned in backward order:
  selecting a candidate modifiable element whose spatial propagation map does not overlap with the heat map of said frame;
  updating said information representative of the usage of a pixel for temporal prediction for all pixels used as reference by macroblocks of said spatial propagation map associated with said modified value of said selected candidate modifiable element.

8. The method according to claim 7 wherein selecting a candidate modifiable element comprises discarding candidate modifiable elements when the value in the heat map of at least one pixel in the spatial propagation map is not equal to zero.

9. The method according to claim 7 wherein selecting a candidate modifiable element comprises:
  for each candidate modifiable element, determining a first dependency value comprising the number of pixels in the spatial propagation map of said candidate modifiable element that are used for prediction according to the heat map;
  discarding all candidate modifiable elements having said first dependency value larger than a first threshold.

10. Method according to claim 7 wherein selecting a candidate modifiable element comprises:
  for each candidate modifiable element, determining a second dependency value comprising the sum of the information representative of the usage of a pixel for temporal prediction associated with the pixels in the spatial propagation map of said candidate modifiable element;
  discarding all candidate modifiable elements having said second dependency value larger than a second threshold.

11. A device for determining a set of modifiable elements of a coded bit-stream representative of an audio video content comprising at least one processor configured, for a part of the coded bit-stream coding a group of pictures, to:
  determine a set of a candidate modifiable elements, wherein a candidate modifiable element comprises a modified value for a segment of the coded bit-stream at a given location and a spatial propagation map associated with said modified value, said spatial propagation map comprising pixels whose decoding is impacted when said modified value is placed in the coded bit stream at said given location;
  determine a heat map for each reference frame comprising, for each pixel of said reference frame, an information representative of the usage of said pixel for temporal prediction during the decoding of said part of said coded bit-stream coding a group of pictures;
  obtain a set of modifiable elements among said set of candidate modifiable elements wherein a modifiable element has a spatial propagation map that does not overlap with corresponding heat map.

12. A device for determining a set of modifiable elements of a coded bit-stream representative of an audio video content, the device comprising for a part of the coded bit-stream coding a group of pictures:
  means for determining a set of a candidate modifiable elements, wherein a candidate modifiable element comprises a modified value for a segment of the coded bit-stream at a given and a spatial propagation map associated with said modified value, said spatial propagation map comprising pixels whose decoding is impacted when said modified value is placed in the coded bit stream at said given location;
  means for determining a heat map for each reference frame, said heat map comprising, for each pixel of a reference frame, an information representative of the usage of said pixel for temporal prediction during the decoding of said part of said coded bit-stream coding a group of pictures;
  and means for obtaining a set of modifiable elements among said set of candidate modifiable elements, wherein a modifiable element has a spatial propagation map that does not overlap with corresponding heat map.

13. A non-transitory program storage device, readable by a computer, tangibly embodying a program of instructions executable by the computer to perform a method for determining a set of modifiable elements of a coded bit-stream representative of an audio video content, said program comprising instructions for a part of said coded bit-stream coding a group of pictures for:
  determining a set of candidate modifiable elements, wherein a candidate modifiable element comprises a modified value for a segment of the coded bit-stream at a given location and a spatial propagation map associated with said modified value, said spatial propagation map comprising pixels whose decoding is impacted when said modified value is placed in the coded bit stream at said given location;
  determining a heat map for each reference frame comprising, for each pixel of said reference frame, an information representative of the usage of said pixel for temporal prediction during the decoding of said part of said coded bit-stream coding a group of pictures;
  obtaining a set of modifiable elements among said set of candidate modifiable elements, wherein a modifiable element has a spatial propagation map that does not overlap with corresponding heat map.

* * * * *